(12) United States Patent
Avivi et al.

(10) Patent No.: US 8,218,492 B2
(45) Date of Patent: Jul. 10, 2012

(54) APPARATUS, SYSTEMS AND METHODS FOR SWITCHING MIMO TRANSMISSION TECHNIQUES IN WIRELESS COMMUNICATION SYSTEMS

(75) Inventors: Rotem Avivi, Petah-Tiqwa (IL); Yuval Lomnitz, Herzelia (IL); Uri Perlmutter, Hollom (IL)

(73) Assignee: Intel Corporation, Santa Clara, CA (US)

(*) Notice: Subject to any disclaimer, the term of this patent is extended or adjusted under 35 U.S.C. 154(b) by 425 days.

(21) Appl. No.: 12/459,255

(22) Filed: Jun. 26, 2009

(65) Prior Publication Data

US 2010/0329160 A1 Dec. 30, 2010

(51) Int. Cl.
*H04W 4/00* (2009.01)
(52) U.S. Cl. ........................................... 370/329
(58) Field of Classification Search .................. 370/329
See application file for complete search history.

(56) References Cited

U.S. PATENT DOCUMENTS

2005/0053170 A1* 3/2005 Catreux et al. ................ 375/267
2005/0243942 A1* 11/2005 Sawai ........................... 375/267
2007/0211641 A1* 9/2007 Fu et al. ........................ 370/241

FOREIGN PATENT DOCUMENTS

| KR | 10-2002-0022109 A | 3/2002 |
| KR | 10-2002-0089094 A3 | 11/2002 |
| WO | 01-43309 A2 | 6/2001 |
| WO | 03-085876 A1 | 10/2003 |

OTHER PUBLICATIONS

International Search Report/Written Opinion for PCT Patent Application No. PCT/US2010/033485, mailed on Aug. 25, 2010, 8 pages.

* cited by examiner

*Primary Examiner* — Gary Mui
*Assistant Examiner* — Richard K Chang
(74) *Attorney, Agent, or Firm* — Thorpe North & Western, LLP

(57) ABSTRACT

An embodiment of the present invention provides an apparatus that may include a transceiver operable to communicate with a receiver in a wireless network and adapted to select an optimal mode for transmissions, wherein the receiver estimates the optimal mode and feeds it back to the transceiver which changes a transmitted mode accordingly and wherein the optimal mode is based on a predetermined metric based on a performance equation that puts a threshold to separate between a high correlated signal to low correlation signal.

14 Claims, 3 Drawing Sheets

APPARATUS, SYSTEMS AND METHODS FOR SWITCHING MIMO TRANSMISSION TECHNIQUES IN WIRELESS COMMUNICATION SYSTEMS

BACKGROUND

In wireless communications, MIMO wireless systems are usually designed such that they can offer high data throughput (e.g. when using a spatial multiplexing scheme) or diversity (e.g. when using transmit diversity scheme). There are few fairly inefficient suggestions on how to select between the two MIMO schemes, such as: Selection based on condition number of the instantaneous channel matrix; Selection based on minimum Euclidian distance for each of the schemes; and Selection based on Demmel condition number. However, each of these techniques have significant drawbacks.

Thus, a strong need exists for improved apparatus, systems and methods for switching MIMO transmission techniques in wireless communication systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
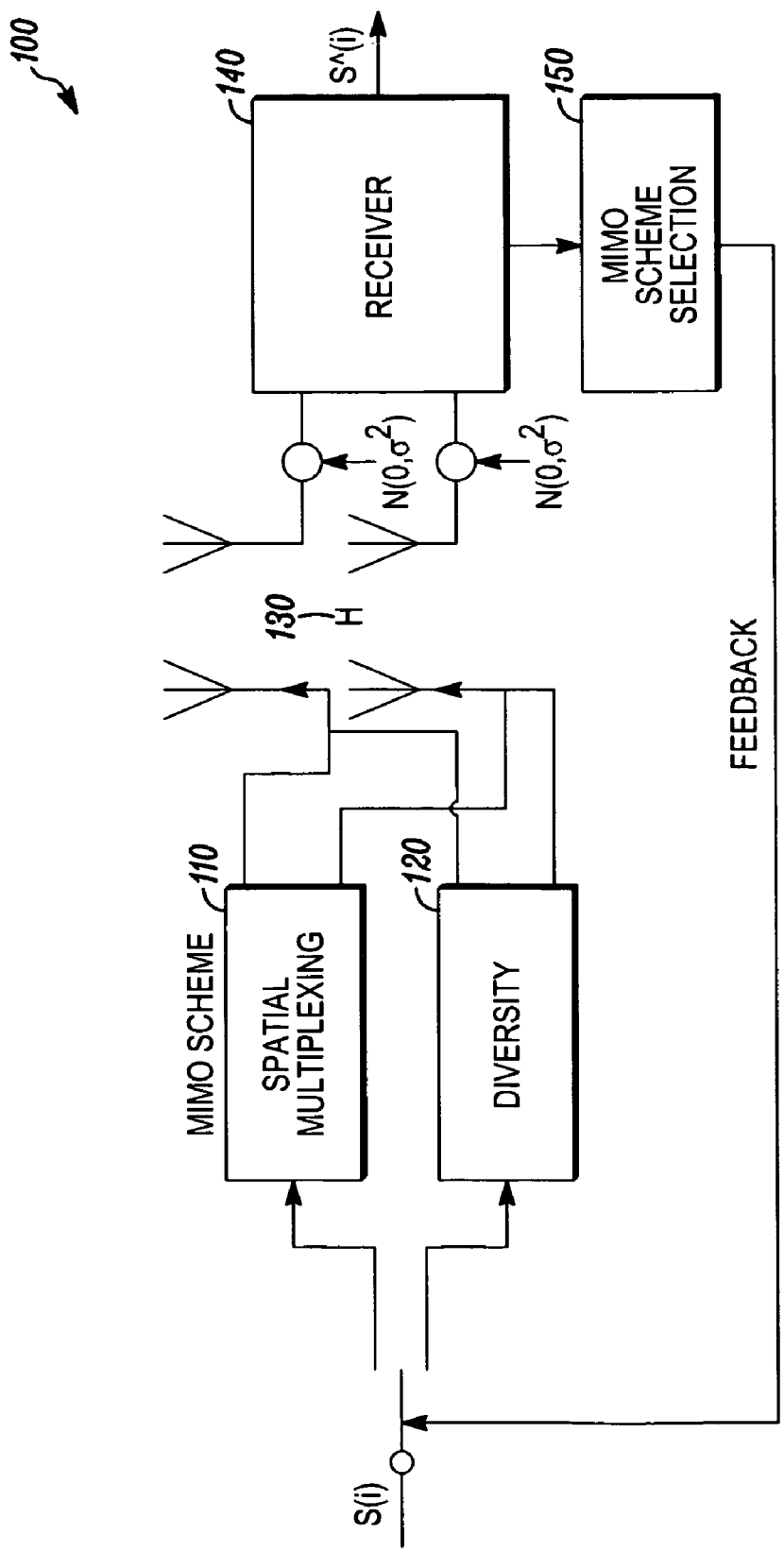
FIG. 1 depicts a block diagram of a system according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

MIMO wireless systems are usually designed such that they can offer high data throughput (e.g. when using spatial multiplexing scheme) or diversity (e.g. when using transmit diversity scheme). Some embodiments of the present invention provide a simple method to select the optimal scheme. Looking now at FIG. 1, shown generally as 100, the input data s(i) is transmitted using the selected scheme. For example, but not by way of limitation, the MIMO scheme using diversity 120 or spatial multiplexing 110. Then, the signal passes through MIMO channel H 130 and finally is received and decoded in the receiver 140 and reconstructed to s^(i). The receiver should estimate the optimal mode 150 and feed it back to the transmitter which changes the transmitted scheme accordingly.

Embodiments of the present invention provide a method to select between the two MIMO schemes and may calculate, although not limited in this respect, as follows. The equation for a metric that may be used is:

$$\text{metric} = \det(H*H)\sigma^{-4} / tr(H*H)\sigma^{-2} = \frac{\lambda_1 \lambda_2}{\lambda_1 + \lambda_2}\sigma^{-2}$$

where H is a 2×2 MIMO channel, tr( ) and det( ) are trace and determinant respectively, $\lambda_{1,2}$ are the eigenvalues of H*H where * operator is conjugate transpose and $\sigma^2$ is the noise variance added in said receiver.

Figure 2:
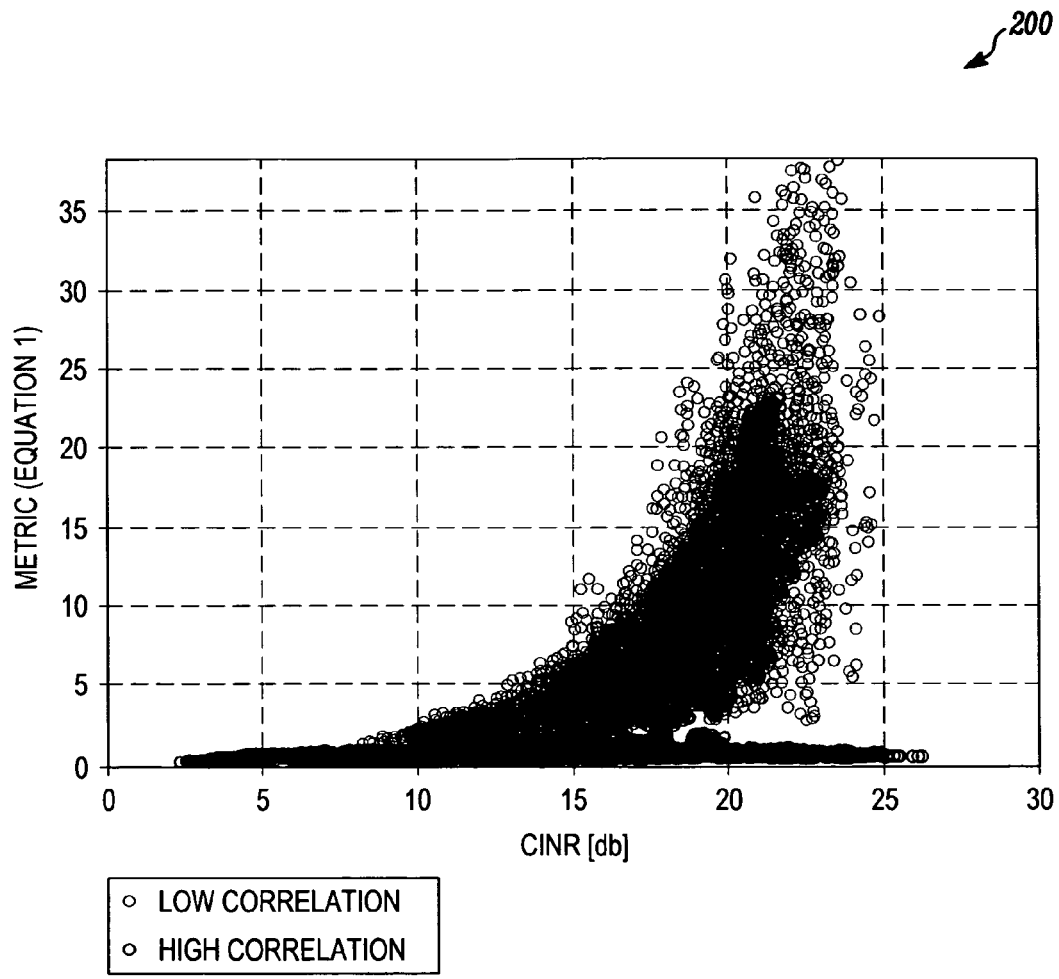
FIG. 2 depicts the performance of a possible metric according to an embodiment of the present invention.

Looking now at FIG. 2, generally as 200, is seen the performance of the suggested metric in equation set forth above. It is clearly seen that for each channel to interference noise ratio (CINR), it is possible to put a threshold to separate between high correlated signal (where it is desired to prevent working with Spatial Multiplexing) to low correlation signal.

Figure 3:
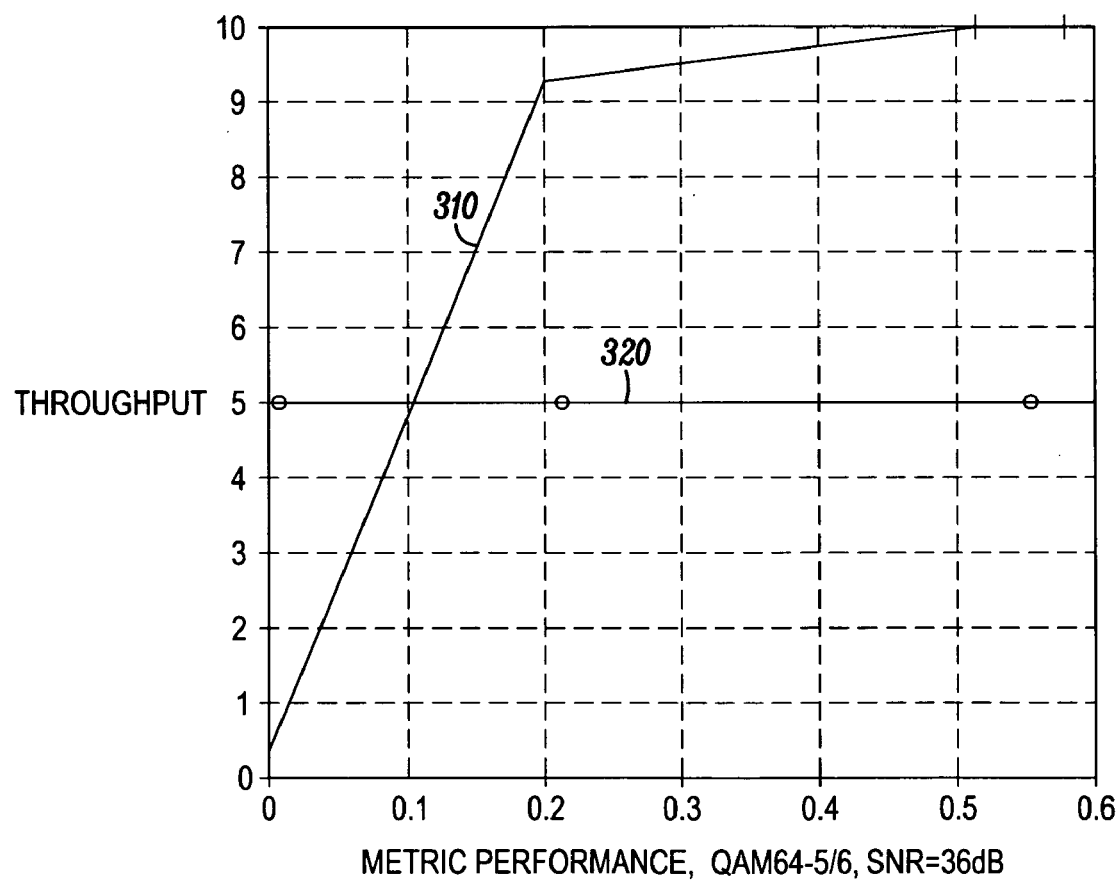
FIG. 3 depicts the average throughput in QAM64 5/6 versus the metric suggested of the present invention according to an embodiment of the present invention.

In FIG. 3 at 300, is shown the average throughput in QAM64 5/6 versus the metric suggested in the equation above. As seen in this FIG. 3, under high SNR (e.g. 36 dB), when the channel is correlative, throughput of matrix A 310 is higher than matrix B 320. This occurs when the suggested metric in the aforementioned equation give values lower than 0.1.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising: a transceiver operable to communicate with a receiver in a wireless network and adapted to select an optimal mode for transmissions, wherein said receiver estimates said optimal mode and feeds it back to said transceiver which changes a transmitted mode accordingly; and wherein said optimal mode is based on a predetermined metric based on a performance equation that puts a threshold to separate between a high correlated signal to low correlation signal: wherein said predetermined metric is:

$$\text{metric} = \det(H*H)\sigma^{-4}/tr(H*H)\sigma^{-2} = \frac{\lambda_1\lambda_2}{\lambda_1+\lambda_2}\sigma^{-2}$$

where H is a 2×2 MIMO channel, tr( ) and det( ) are trace and determinant respectively, $\lambda_{1,2}$ are the eigenvalues of H*H where * operator is conjugate transpose and $\sigma^2$ is the noise variance added in said receiver.

2. The apparatus of claim 1, wherein said modes of transmission are MIMO special spatial multiplexing (SM) and diversity.

3. The apparatus of claim 2, wherein for a high correlated signal SM transmissions are prevented.

4. The apparatus of claim 1, wherein said transceiver is optimized when said metric is lower than 0.1.

5. A method, comprising: estimating an optimal mode for transmissions by a transceiver communicating with a receiver in a wireless network, wherein said receiver estimates said optimal mode and feeds it back to said transceiver which changes a transmitted mode accordingly; and wherein said optimal mode is based on a predetermined metric based on a performance equation that puts a threshold to separate between a high correlated signal to low correlation signal~ wherein said predetermined metric is:

$$\text{metric} = \det(H*H)\sigma^{-4}/tr(H*H)\sigma^{-2} = \frac{\lambda_1\lambda_2}{\lambda_1+\lambda_2}\sigma^{-2}$$

where H is a 2×2 MIMO channel, tr( ) and det( ) are trace and determinant respectively, $\lambda_{1,2}$ are the eigenvalues of H*H where * operator is conjugate transpose and $\sigma^2$ is the noise variance added in said receiver.

6. The method of claim 5, wherein said modes of transmission are spatial multiplexing (SM) and diversity.

7. The method of claim 5, further comprising preventing SM transmission for a high correlated signal.

8. The method of claim 5, wherein said transceiver is optimized when said metric is lower than 0.1.

9. A non-transitory computer readable medium encoded with computer executable instructions, which when accessed, cause a machine to perform operations comprising: estimating an optimal mode for transmissions by a transceiver communicating with a receiver in a wireless network, wherein said receiver estimates said optimal mode and feeds it back to said transceiver which changes a transmitted mode accordingly; and wherein said optimal mode is based on a predetermined metric based on a performance equation that puts a threshold to separate between a high correlated signal to low correlation signal, wherein said predetermined metric is:

$$\text{metric} = \det(H*H)\sigma^{-4}/tr(H*H)\sigma^{-2} = \frac{\lambda_1\lambda_2}{\lambda_1+\lambda_2}\sigma^{-2}$$

where H is a 2×2 MIMO channel, tr( ) and det( ) are trace and determinant respectively, $\lambda_{1,2}$ are the eigenvalues of H*H where * operator is conjugate transpose and $\sigma^2$ is the noise variance added in said receiver.

10. The computer readable medium encoded with computer executable instructions of claim 9, wherein said modes of transmission are special multiplexing (SM) and diversity.

11. The computer readable medium encoded with computer executable instructions of claim 10, further comprising additional instructions that provide preventing SM transmission for a high correlated signal.

12. A system, comprising: a first transceiver operable as a base station (BS) in a wireless network; and a second transceiver operable as a mobile station (MS) is said wireless network and operable to communicate with said BS; wherein said BS is adapted to select an optimal mode for transmissions and wherein said receiver estimates said optimal mode and feeds it back to said transceiver which changes a transmitted mode accordingly; and wherein said optimal mode is based on a predetermined metric based on a performance equation that puts a threshold to separate between a high correlated signal to low correlation signal: wherein said predetermined metric is:

$$\text{metric} = \det(H*H)\sigma^{-4}/tr(H*H)\sigma^{-2} = \frac{\lambda_1\lambda_2}{\lambda_1+\lambda_2}\sigma^{-2}$$

where H is a 2×2 MIMO channel, tr( ) and det( ) are trace and determinant respectively, $\lambda_{1,2}$ are the eigenvalues of H*H where * operator is conjugate transpose and $\sigma^2$ is the noise variance added in said receiver.

13. The system of claim 12, wherein said modes of transmission are spatial multiplexing (SM) and diversity.

14. The system of claim 13, wherein for a high correlated signal SM transmissions are prevented.

\* \* \* \* \*